(No Model.)
E. THOMSON.
ELECTRIC WELDING INDICATOR.
No. 555,130. Patented Feb. 25, 1896.
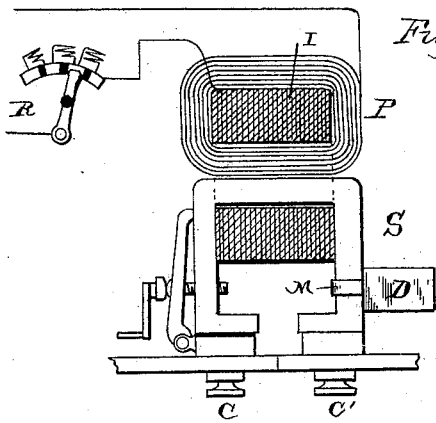
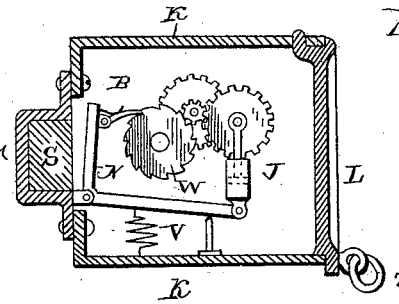
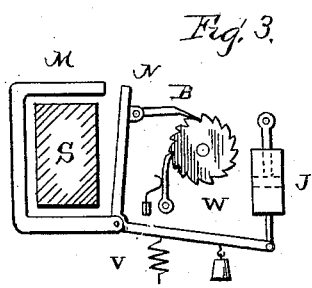
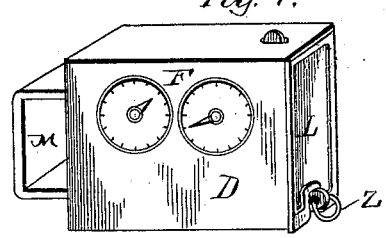
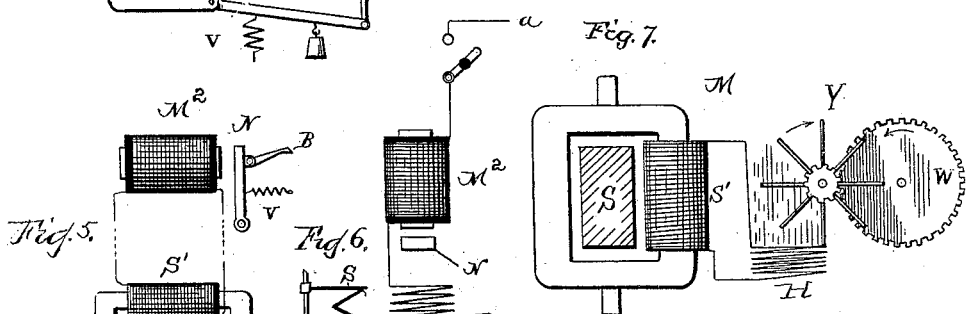
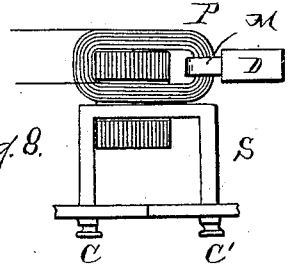
WITNESSES:
Ira P. Steward
H. H. Capel
INVENTOR
ELIHU THOMSON
BY
Townsend MacArthur
ATTORNEYS

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

ELECTRIC WELDING INDICATOR.

SPECIFICATION forming part of Letters Patent No. 555,130, dated February 25, 1896.

Application filed July 23, 1888. Serial No. 281,038. (No model.)

*To all whom it may concern:*

Be it known that I, ELIHU THOMSON, a citizen of the United States, and a resident of Lynn, in the county of Essex and State of Massachusetts, have invented a certain new and useful Electric Welding Indicator, of which the following is a specification.

The object of my invention is to provide a reliable and accurate means for registering or indicating the number of operations performed upon an electric welding machine or other similar apparatus for metal-working by electricity—such, for instance, as machines for electric soldering, brazing, forging, stamping, or shaping, in which a current of electricity passing through the work is employed as the heating agent.

The object of my invention is also to secure an accurate registry or record while at the same time permitting a free mechanical movement of the clamps or holders to and fro in any one operation of the apparatus, a result which would not be readily attainable if the register were mechanically operated by the motions of the clamps themselves as pieces are taken out and put in or by the motion of the clamps or holders in the operation itself or by the exertion of pressure upon the pressure-piece of the apparatus.

The object of my invention is further to so apply the register or indicator that it cannot be tampered with or made to show a registry or count less than the actual number of times that the machine is used.

Examples of apparatus for use with which my invention is designed are found in my Patents Nos. 347,140 and 347,141.

My invention consists essentially in registering or indicating the number of operations performed upon the apparatus by means of a register or indicator electrically controlled or operated in any desired manner by means of the electric current employed in operating the apparatus. Such electric current may be that which sets up the heating-current, may be the heating-current itself, or may be a current induced by the heating-current, or by the current which produces the heating-current. I prefer, however, to use the heating-current itself as the agency for controlling or operating the register.

My invention consists further in clamping or locking the closed or sealed register apparatus directly to the bar or conductor conveying the heavy electric current to the holding-clamps for the work and in preferably close proximity to the clamps or holders, so that the register or indicator will be operated by the heating-current passing to the work. The bar or rod upon which the clamps or holders are secured may be conveniently employed in this way.

In cases where a transformer forms a part of the apparatus and the register with its operating or controlling devices is securely boxed against interference the locking of said register to the secondary bar will efficiently guard against use of the apparatus without the production of corresponding indications in the register.

In the accompanying drawings, Figure 1 is a plan and partial section of an apparatus embodying my invention. Fig. 2 is a cross-section through the register or indicator and the bar or conductor to which it is applied. Fig. 3 shows parts of the register detached or removed from their casing. Fig. 4 is a perspective view of the register-casing and attached strap or yoke by which it is secured in place. Figs. 5, 6, 7, and 8 illustrate modifications of the invention.

Referring to Fig. 1, P S I indicate an induction-coil of suitable construction for developing heavy currents in the bar or conductor S through the inductive action of alternating currents circulating in a finer coil P and governed by a variable resistance or other device inserted at R. The two conductors are applied to a common iron core I, preferably made of plates of iron assembled together as usual.

The clamps or devices for holding the work to be heated by the electric current are indicated at C C'. These clamps are mounted upon or electrically connected to the conductor S, which carries the heavy electric current used in the welding, forging, brazing, upsetting, or other metal-working operation. One or both of the clamps may be made movable in any proper manner according to the particular operation to be performed.

The apparatus described is typical of any apparatus using a heavy electric current as a means of locally heating a piece or pieces of metal which are to be subjected to any metal-working operation.

In Fig. 1 I have illustrated a manner of applying a register so that the same shall be operated by the current circulating in the conductor or bar S, which forms the path of the heating-current itself.

D indicates the register, and M an iron strap or bar applied transversely to the rod or bar S. The strap M serves to secure the register to the conductor or bar S, and is for this purpose firmly riveted or secured to the casing K of the register.

Within the magnetic field of the current circulating in the conductor S is pivoted an armature N, preferably arranged to form with the iron of the strap M the magnetic circuit around the bar. The armature N is the operating or controlling armature for the registering or indicating devices mounted within the case K in any suitable manner. In the present instance I have shown the armature as arranged to operate upon a ratchet-wheel W for a train of wheels having dials F, like the dials of any register or counter or of a gas-meter. The operating-pawl carried by the armature and working upon the teeth of wheel W is indicated at B. V indicates a suitable retracting-spring connected to the lever which carries the armature N and adapted to move the lever and pawl in a direction to move the wheel when the current ceases to flow in the conductor S or becomes so weak as to allow the retractor to overcome the attraction upon the armature.

A dash-pot J may be employed for retarding the movements of the armature-lever to any desired extent as the same moves backward and forward under the action of the current and the retractor.

The dials F may be suitably marked to indicate the number of oscillations of the armature N.

The register dials or pointers are preferably inclosed or covered with a glass in proper manner to prevent the same from being tampered with.

When in the operation of welding, forging, or the like a current of sufficient strength passes in the conductor S, it magnetizes the iron strap M and armature N, so that the latter draws back the pawl B and permits the same to engage with a fresh tooth of the wheel W. On the cessation or cutting off of the current in the conductor S the armature N moves backward, carrying the pawl with it, with a rapidity greater or less according to the condition of the dash-pot. In so moving the pawl B moves the wheel W one tooth and registers one operation completed. If, however, the current is re-established or put on in the conductor S before the armature N, retarded in its movement by the dash-pot, has time to move the pawl D the distance of one whole tooth no count is made. The adjustment should be such that the time occupied by the armature in moving back to complete the registry will be less than is required to take out the objects operated upon in the clamp and replace them by others. By so adjusting the movements it is obvious that a count will invariably be made for each completed operation.

The apparatus will work with either direct or alternating currents in the conductor S.

It is, of course, to be understood that the case K is suitably sealed or locked to prevent tampering with any portion of the register or indicating mechanism.

The lid or cover of the box adapted to be locked is indicated at L. The means for locking the same consists of a ring or padlock inserted at Z in an eye projecting from the box K and passing through a slot in the lid L. The opposite side of the lid has a tongue or lug which enters a hole in the top of the casing to secure it in place. The ring Z might be a ring of metal of peculiar form or composition welded into the eye, or a padlock of any desired character may be used.

It is obvious that the attraction of the armature N toward M is due to the development of circular magnetism around the conductor S by the current in the latter.

I have described one form of register or indicator which may be used for carrying out my invention, but wish to be understood as not limiting myself to the particular form described, since any kind of register or indicator which will keep a count of the number of successive operations and which is of proper construction to be electrically operated or controlled, as well known in the art, will answer the purposes of my invention. It is, of course, desirable that the parts of the register should be properly placed so as to be free from the danger of tampering by persons desiring to produce a false record.

It is obvious that by the construction described the strap M when made of iron serves the double function of securing the register to the bar and of becoming the seat of magnetic lines which shall operate upon the controlling or actuating portion of the register or indicator. It is obvious, however, that means independent of said strap of iron might be employed for the purpose of fixing the register in place.

As will be seen from an inspection of Fig. 1, the strap M is applied at such part of the conductor S that the register cannot be slipped off of the conductor. The strap might be riveted in place or secured by screws passing from the interior of the case K outward into the strap. It is obvious that in this case the register can only be removed by breaking the seal of the casing K, so as to allow access to the interior.

In the arrangement shown in Figs. 1, 2, and 3 the welding-current itself acts upon the register, but as before mentioned the current for controlling or operating the register might be induced from such welding-current. An example of this arrangement is indicated in Fig. 5, where the strap or bar M, encircling a conductor S, is provided with a coil S', connected with an electromagnet M², whose core attracts the armature N for the register or indicator. In this instance the conductor S becomes the seat of induced currents set up through the action of the conductor S upon the bar or strap M of iron. It is obvious that this form is particularly suited for use with alternating currents. The parts of the register are, as before, to be placed in a case secured against tampering. The strap is provided with suitable ears by which it may be fastened to the casing, as shown.

Another modification in the manner of carrying out my invention (indicated in Fig. 6) consists in placing the electromagnet M² in the circuit of the primary coil of the induction-coil when such circuit is used with the secondary S, which is the seat of the heavy electric currents employed in the metal-working operation. In this case, as before, the register is necessarily operated whenever the apparatus is used for welding, forging, or like process.

Fig. 7 illustrates a modification in the manner of communicating movement to the register from the effects of current set up as an accompaniment of the metal-working operation. In this case the currents passing from the coil S' circulate in considerable volume in a heating-coil H, and the heated-air currents produced by the latter impart movement to a wheel Y, which turns a part of the register or indicating mechanism. This arrangement serves to measure roughly the current used in the circuit or conductor S, multiplied by the time of use, or, in other words, the coulombs or ampère-seconds.

In Fig. 8 the register is shown as fastened to the conductor P, which is the seat of the primary currents instead of to the conductor S, which carries the current that passes through the work. The yoke M, as before, forms a strap or yoke which is attached to the conductor P in such way that it cannot be removed.

It is obvious that the register might in like manner be operated or controlled directly or indirectly by any current which is established simultaneously with or consequent upon the flow of current through the clamps or holders for the work. I prefer, however, to employ the manner of applying the register and securing an electric or magnetic effect for operating or controlling the same which I have hereinbefore described.

While I have described herein a device which gives a register of the number of operations, I do not wish to be understood as confining myself to a train of wheels and a pointer, since it is obvious that I may employ any other mechanism electrically or magnetically controlled which will show the number of times that the circuit is closed or will otherwise indicate the extent to which the apparatus is used by indicating or showing the flow of current in the conductor S or its equivalent, as described.

What I claim as my invention is—

1. The combination with an electric welding, forging, brazing or other electric metal-working apparatus, of a register or counter, a reciprocating actuating or controlling device therefor responsive to the flow of an electric current accompanying the heating of the work, and a retarding device connected to the said reciprocating mechanism, as and for the purpose described.

2. The combination with an electric transformer, of a counter secured to the secondary bar or circuit of such transformer, and means for actuating or controlling such counter by the current flowing in the bar, as and for the purpose described.

3. The combination with an electric metal-working apparatus, of a register or indicating apparatus securely sealed and fastened to a conductor through which a current flows at each operation of the machine, and means for actuating the register by the current in the conductor, as and for the purpose described.

4. The combination with an electric conductor, of a register or counter having an operating or controlling device governed by the current in said conductor, said register and its controlling parts being locked or fastened to the conductor and securely sealed against tampering, as and for the purpose described.

5. The combination with an electric conductor, of a register having an operating or controlling armature, and a yoke or ring for securing the register to the conductor with the armature in proximity to the side thereof.

6. The combination with an electric conductor, of a register or indicator electrically controlled or operated, a strap of iron transverse to the conductor for fastening the register to the conductor, and an armature for the register or recorder arranged in a magnetic circuit around the conductor with the strap.

7. The combination with the conductor and the register operated or controlled by the current in said conductor, of the iron bar or strap M, fastened transverse to said conductor, and an armature arranged to be attracted to said strap, as and for the purpose described.

Signed at Lynn, in the county of Essex and State of Massachusetts, this 19th day of July, A. D. 1888.

ELIHU THOMSON.

Witnesses:
J. W. GIBBONEY,
F. C. LEMP.